US010130032B2

(12) United States Patent
Cavkusic et al.

(10) Patent No.: US 10,130,032 B2
(45) Date of Patent: Nov. 20, 2018

(54) VOLUME EXTENDING ASSEMBLY FOR COMBINE STORAGE TANK

(71) Applicant: Crary Industries, Inc., West Fargo, ND (US)

(72) Inventors: Damir Cavkusic, Fargo, ND (US); Ben Richard, Fargo, ND (US); Michael Leach, Fargo, ND (US); Mitchell Lee, Fargo, ND (US)

(73) Assignee: Crary Industries, Inc., West Fargo, ND (US)

( * ) Notice: Subject to any disclaimer, the term of this patent is extended or adjusted under 35 U.S.C. 154(b) by 0 days.

(21) Appl. No.: 15/438,877

(22) Filed: Feb. 22, 2017

(65) Prior Publication Data

US 2017/0238462 A1 Aug. 24, 2017

Related U.S. Application Data

(60) Provisional application No. 62/298,344, filed on Feb. 22, 2016.

(51) Int. Cl.
*A01D 41/12* (2006.01)
(52) U.S. Cl.
CPC ................. *A01D 41/1226* (2013.01)
(58) Field of Classification Search
CPC .... B65D 88/005; B65D 88/123; B65D 88/12; A01D 41/1226; A01D 41/1208; A01F 12/60
See application file for complete search history.

(56) References Cited

U.S. PATENT DOCUMENTS

| 3,997,089 A | * | 12/1976 | Clarke | ...................... B60P 1/56 105/280 |
| 4,466,549 A | * | 8/1984 | Hanaway | ........... A01D 41/1226 220/4.03 |
| 4,544,196 A | * | 10/1985 | Schmeichel | ........... B62D 33/08 254/129 |
| 4,700,640 A | * | 10/1987 | Andersson | ........... A01C 15/006 111/170 |
| 5,151,064 A | * | 9/1992 | Damman | ........... A01D 41/1226 460/119 |

(Continued)

OTHER PUBLICATIONS

Operators/Assembly Manual for "Combine Grain Tank Extension Tip-Up Kit MS75e", Lakes Enterprises, Inc. dba Maurer Manufacturing.

*Primary Examiner* — Arpad Fabian-Kovacs
(74) *Attorney, Agent, or Firm* — Wood, Phillips, Katz, Clark & Mortimer

(57) ABSTRACT

An extension assembly for a processed crop storage tank on a combine. A closure assembly for a top opening on the tank has at least one panel with one surface area that is exposed to bound a part of an exterior space above the storage space with the closure assembly open. The extension assembly has a first extension panel with a first surface with a first area and a connecting system through which the first extension panel is operatively connected to the combine. The first extension panel is changeable between a deployed position and a stored position. In the deployed position the first surface and one surface define a combined exposed surface area that is greater than the first area of the first surface. The combined surface area is exposed to confine processed crop in the exterior space with the closure assembly open.

23 Claims, 11 Drawing Sheets

(56) References Cited

U.S. PATENT DOCUMENTS

| | | | |
|---|---|---|---|
| 5,865,414 A * | 2/1999 | Beitzel | A47B 5/00 248/284.1 |
| 6,074,298 A * | 6/2000 | Majkrzak | A01D 41/1208 460/119 |
| 6,206,779 B1 * | 3/2001 | Gerber | A01C 15/005 414/502 |
| 6,508,705 B1 * | 1/2003 | Van Overschelde | A01D 41/1226 296/15 |
| 9,907,228 B2 * | 3/2018 | Vandevelde | A01F 12/444 |
| 2003/0078085 A1 * | 4/2003 | Gerber | A01D 41/1226 460/119 |
| 2003/0232634 A1 * | 12/2003 | Johnson | A01D 41/1226 460/119 |
| 2004/0033823 A1 * | 2/2004 | Stephens | A01D 41/1208 460/119 |
| 2004/0254003 A1 * | 12/2004 | Colpaert | A01D 41/1208 460/119 |
| 2004/0259612 A1 * | 12/2004 | Ramon | A01D 41/1226 460/119 |
| 2008/0261672 A1 * | 10/2008 | Stukenholtz | A01D 41/1226 460/119 |
| 2008/0265601 A1 * | 10/2008 | Mohr | A01D 41/1226 296/15 |
| 2009/0215509 A1 * | 8/2009 | Johnson | A01D 41/1226 460/23 |
| 2009/0270149 A1 * | 10/2009 | Sprau | A01D 41/1226 460/119 |
| 2010/0285854 A1 * | 11/2010 | Temple | A01D 41/1208 460/119 |
| 2011/0049927 A1 * | 3/2011 | Horst | A01D 41/1226 296/100.18 |
| 2011/0095554 A1 * | 4/2011 | Zeuner | A01D 41/1226 296/15 |
| 2013/0196724 A1 * | 8/2013 | Barnes | A01D 41/1226 460/119 |
| 2013/0196725 A1 * | 8/2013 | Bossuyt | A01D 41/1226 460/119 |
| 2013/0252681 A1 * | 9/2013 | Cooksey | A01D 41/1226 460/119 |
| 2013/0296005 A1 * | 11/2013 | Claes | A01D 41/1226 460/119 |
| 2015/0148112 A1 * | 5/2015 | Ducroquet | A01D 41/1226 460/119 |
| 2015/0272000 A1 * | 10/2015 | Claes | A01D 41/00 56/473.5 |
| 2016/0001792 A1 * | 1/2016 | Gibney | B61D 39/001 105/377.06 |
| 2016/0338269 A1 * | 11/2016 | Steen | A01D 41/1226 |
| 2016/0360696 A1 * | 12/2016 | Vandevelde | E05F 15/53 |
| 2017/0324137 A1 * | 11/2017 | Albano | H01Q 1/1214 |

* cited by examiner

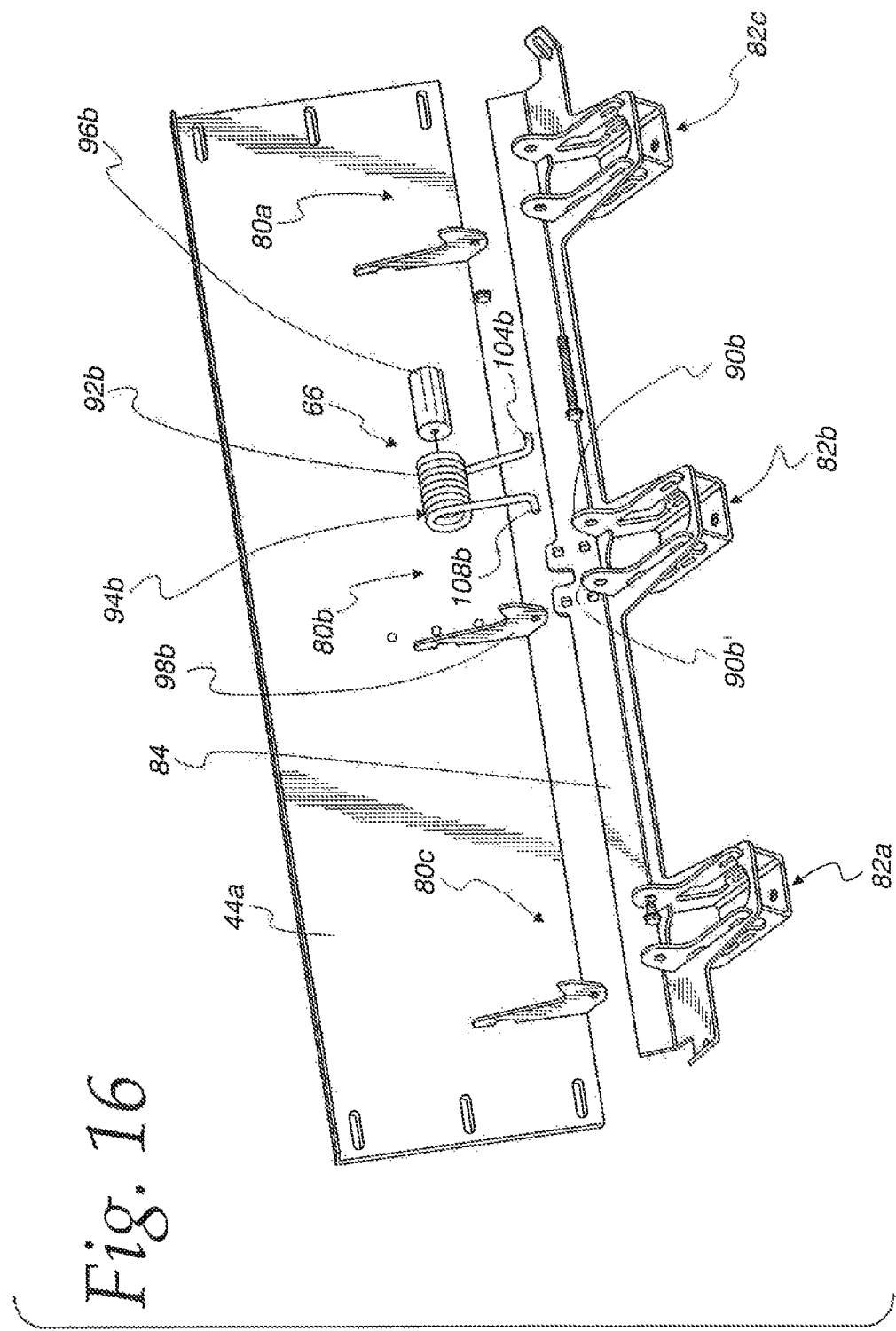

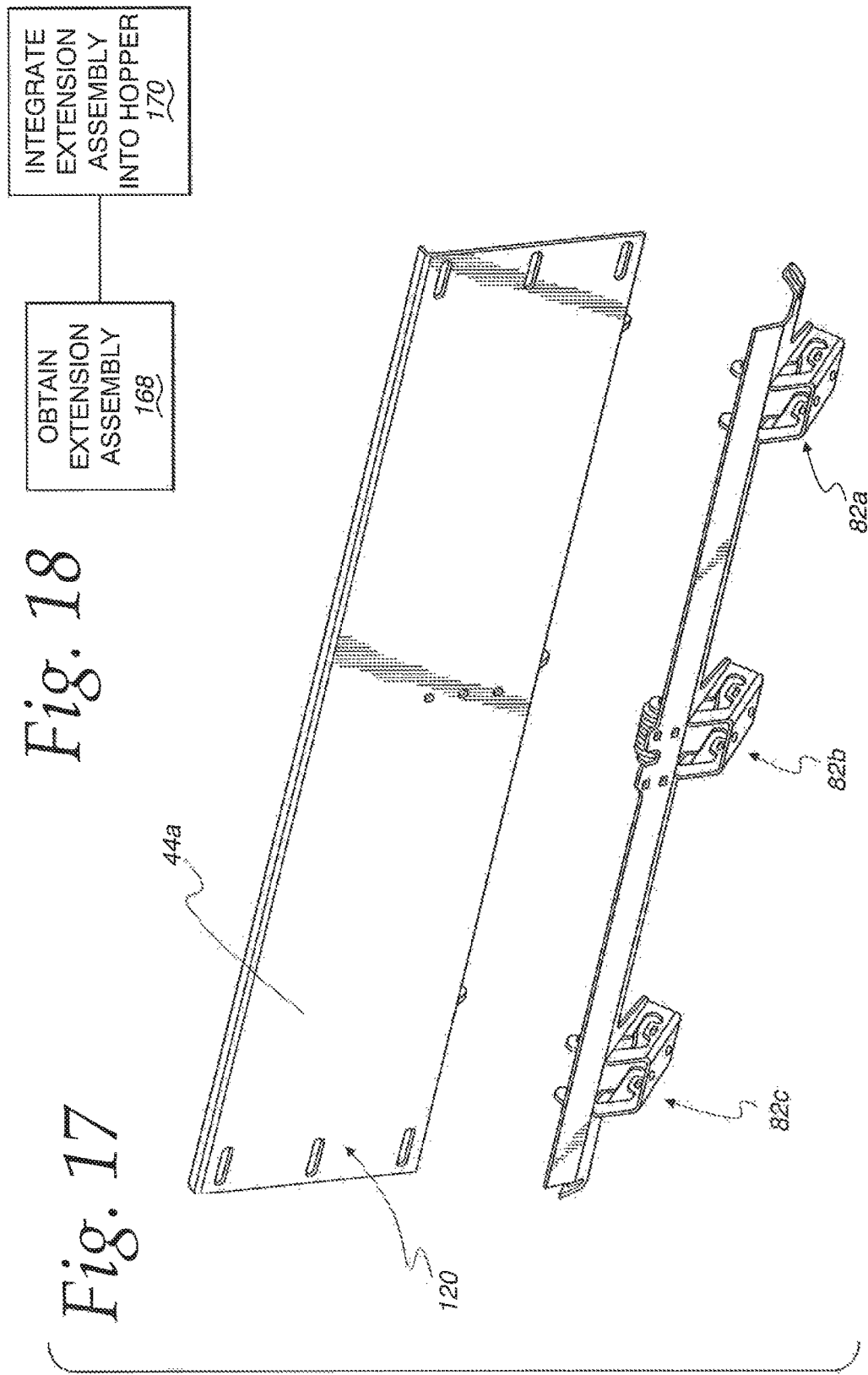

VOLUME EXTENDING ASSEMBLY FOR COMBINE STORAGE TANK

BACKGROUND OF THE INVENTION

Field of the Invention

This invention relates to agricultural combines and, more particularly, to a selectively employable extension assembly that can be utilized to increase the effective volume of a storage tank for crop processed by the combine.

Background Art

Extension assemblies have been utilized on access door panels for combine storage tanks for decades. By increasing the capacity of a storage tank for processed crop, farmers are allowed to harvest a larger volume of crop before having to unload to a cart or trailer.

Typically, these extension assemblies have increased the storage tank capacity by adding height to the access door panels when the panels are in an open position. Various designs have evolved with capabilities of increasing effective storage volume to different degrees. Further, the existing extension assemblies have utilized different components and materials, among which are a combination of steel and rubber, steel and canvas, steel and plastic, or steel only.

Generally, the extension assemblies are relatively simple to install and are easy to take apart for combine storage or over-the-road transport. Until recently, combines have had only manually folding OEM door panels that are repositioned to selectively block and expose a top access opening for the storage tank. A recent trend has been to change more to the option of power folding door panels. The farmer then is not required to leave the combine cab and climb on top of the combine to manipulate the door panels. While a convenience and safety improvement, this automated operation does add extra cost to the combine.

By integrating extension assemblies, the automated folding of door panels has been complicated. To avoid interference of multiple interacting panels, volume extension has generally been achieved by using collapsible canvas/rubber extension materials. With this construction, the extensions can fold, as at the corners, to accommodate repositioning panels. These materials deform readily and thus are generally practically designable only to accommodate a limited increase in volume—otherwise risking the possibility of deformation that might allow escape of harvested crop. This deformation may be effected by the weight of the crop or even by strong winds.

One attempted solution to this problem is to use a surrounding cable to maintain the upper diameter of the extension components. However, this cable may preclude automated operation of the primary panels and may interfere with normal combine operation.

Additionally, the canvas/rubber design is generally aesthetically undesirable. This alone may make the use thereof impractical, particularly given the limited increase in volume made possible thereby.

While use of rigid extension panels contributes to greater structural stability, designing rigid panels: a) with sufficient surface area to significantly increase storage volume; and b) that will at the same time be collapsible through a practical mechanism, has presented a particular challenge. Ideally, these extension assemblies are constructed so that their reconfiguration can be coordinated with the automated operation of the main door panels without requiring complicated mechanisms or any manual intervention by an operator.

The industry continues to be in need of better technology that allows significant increase in storage volume in a form that has good structural integrity and is compatible with automated door panel operation.

SUMMARY OF THE INVENTION

In one form, the invention is directed to an extension assembly for a storage tank on a combine. The storage tank bounds a storage space for processed crop. The storage space has a volume. The combine has a top opening in communication with the storage space. The combine further includes a closure assembly for the top opening with closed and open states. The closure assembly has at least one panel having one surface with one area, that with the one panel in a first position, is exposed to bound a part of an exterior space above the storage space to thereby effectively increase the volume of the storage space with the closure assembly in the open state. The one panel is changed from the first position into a second position as an incident of the closure assembly being changed from the open state into the closed state. The extension assembly consists of a first extension panel having a first surface with a first area, and a connecting system through which the first extension panel is operatively connected to the combine. The operatively connected first extension panel and connecting system are configured so that the first extension panel is changeable between a deployed position and a stored position. The first extension panel in the deployed position is situated so that the first surface and one surface define a combined exposed surface area that is greater than the first area of the first surface. The combined surface area is exposed to confine processed crop in the exterior space with the closure assembly in the open state. The first extension panel is urged by a biasing force into one of the deployed and stored positions.

In one form, the extension assembly is provided in combination with the combine. The first extension panel is connected to the one panel for pivoting movement relative to the one panel around an axis.

In one form, with the first extension panel in the stored position, the one surface and first surface face each other.

In one form, the first extension panel is spring biased relative to the one panel into the stored position.

In one form, the extension assembly and combine are configured so that the first extension panel is changed from the stored position into the deployed position as an incident of the closure assembly changing from the closed state into the open state.

In one form, the combination further includes an actuator that is operable to change the extension panel from the stored position into the deployed position.

In one form, the combine, extension panel, connecting system, and actuator are configured so that operation of the actuator causes the closure assembly to change from the closed state into the open state, as an incident of which the first extension panel is changed from the stored position into the deployed position.

In one form, the connecting system consists of a cable connected to the first extension panel. The cable is tensioned as the closure assembly is changed from the closed state into the open state to thereby overcome the biasing force and move the first extension panel from the stored position into the deployed position.

In one form, the biasing force is generated by a spring member acting between the one panel and the first extension panel.

In one form, the spring member is a torsion coil spring.

In one form, the first extension panel is mounted to the one panel for pivoting movement around an axis. The first extension panel pivots through more than 90° relative to the one panel in changing between the deployed and stored positions.

In one form, the closure assembly has a second panel. The extension assembly includes a flexible barrier layer that extends between the operatively connected first extension panel and the second panel to block migration of harvested crop to between the first extension panel and second panel.

In one form, the closure assembly has a plurality of panels including the one panel that are movable relative to each other as the closure assembly is changed between the closed and open states. The plurality of panels cooperatively: a) block the top opening with the closure assembly in the closed state; and b) extend around a volume of the exterior space within which harvested crop can be confined for storage with the closure assembly in the open state.

In one form, the extension assembly and combine are configured so that the first extension panel is changed from the deployed position into the stored position as an incident of the closure assembly changing from the open state into the closed state.

In one form, the closure assembly has first and second panel pairs. One of the panel pairs includes the one panel and another panel. There is a second extension panel, substantially the same as the first extension panel on the another panel.

In one form, the panels in the one panel pair each is pivotably mounted to the combine so that the panels in the one panel pair pivot simultaneously towards and away from each other as the closure assembly is changed between the closed and open states respectively.

In one form, the panels in the other of the panel pairs each is pivotably mounted to the hopper so that the panels in the other of the panel pairs pivot simultaneously towards and away from each other as the closure assembly is changed between the closed and open states. In the closed state for the closure assembly, a plurality of the panels are in overlying relationship.

In one form, the combine has a main frame and at least one link member that moves guidingly relative to the main frame as the closure assembly is changed between the open and closed states. One part of the cable is connected to follow movement of the one link member.

In one form, the extension assembly has first and second flexible barrier layer components. The first barrier layer component extends between the first extension panel and one of the panels in the other panel pair to block migration of harvested crop to between the first extension panel and the one of the panels in the other panel pair. The second barrier layer component extends between the first extension panel and the other of the panels in the other panel pair to block migration of harvested crop to between the first extension panel and the other of the panels in the other panel pair.

In one form, the invention is directed to the combination of a combine and an extension assembly. The combine has a storage tank bounding a storage space for processed crop. The storage space has a volume. The combine has a top opening in communication with the storage space. The combine further includes a closure assembly for the top opening with closed and open states. The closure assembly consists of at least one panel having one surface with one area that with the one panel in a first position is exposed to bound a part of an exterior space above the storage space to thereby effectively increase the volume of the storage space with the closure assembly in the open state. The one panel is changed from the first position into a second position as an incident of the closure assembly being changed from the open state into the closed state. The extension assembly includes: a first extension panel having a first surface with a first area; and a connecting system through which the first extension panel is operatively connected to the combine. The operatively connected first extension panel and connecting system are configured so that the first extension panel is changeable between a deployed position and a stored position. The first extension panel in the deployed position is situated so that the first surface and one surface define a combined exposed surface area that is greater than the first area of the first surface. The combined surface area is exposed to confine processed crop in the exterior space with the closure assembly in the open state. The connecting system has a cable connected to the first extension panel. The combine and extension assembly are configured so that the cable is controlled to change the position of the first extension panel as an incident of the closure assembly changing between the closed and open state.

In one form, the first extension panel is spring biased into the storage position. The combine and extension assembly are configured so that the extension panel is moved by the cable from the storage position into the deployed position as an incident of the closure assembly changing from the closed state into the open state.

In one form, the invention is directed to a method of retrofitting a combine that has a storage tank bounding a storage space for a processed crop. A top opening is in communication with the storage space. A closure assembly for the top opening consists of a plurality of panels movable to thereby change the closure assembly between closed and open states. The combine is configured so that with the closure assembly in the open state harvested crop can move from the storage space upwardly through the top opening and the panels bound a first volume outside of the storage space within which harvested crop can be confined for storage to supplement storage capacity for the storage tank. With the closure assembly in the closed state, the panels cooperatively block the opening. The method includes the steps of: obtaining an extension assembly as described above; and integrating the extension assembly into the combine so that with the closure assembly in the open state, the extension assembly, in conjunction with the closure assembly, bounds a second volume outside of the storage space within which harvested crop can be confined for storage that is greater than the first volume.

BRIEF DESCRIPTION OF THE DRAWINGS

FIG. 16 is an exploded, perspective view of the structure shown in FIG. 15;

FIG. 17 is a view as in FIG. 16 from a different perspective; and

FIG. 18 is a flow diagram representation of a method for providing an extension assembly on a combine, according to the invention.

DETAILED DESCRIPTION OF THE PREFERRED EMBODIMENT

Figure 1:
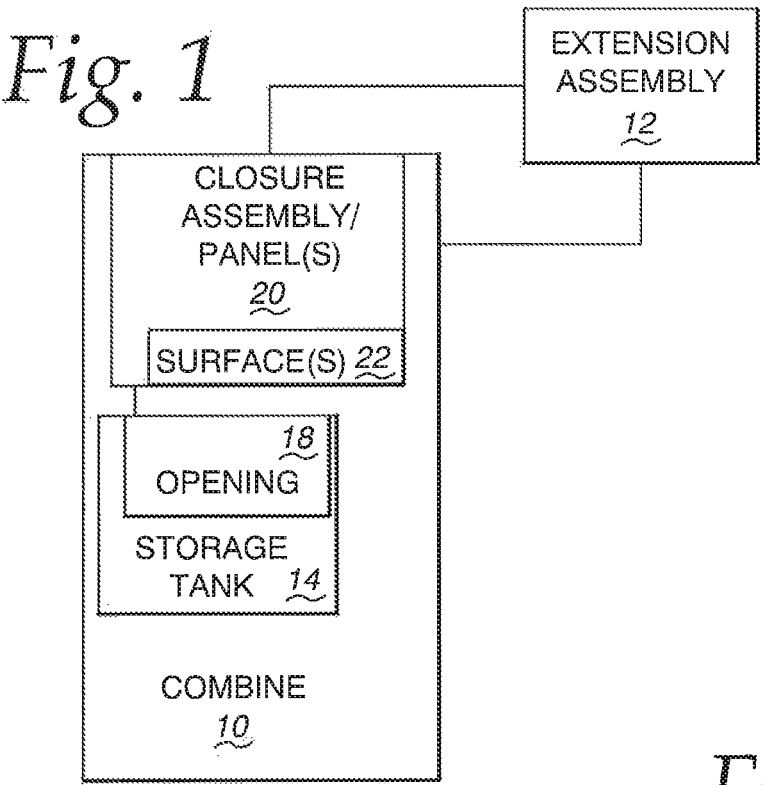
FIG. 1 is a schematic representation of a conventional type combine with a closure assembly for selectively closing an opening to a storage space bounded by a storage tank and with an extension assembly, according to the present invention, incorporated into the combine.

In FIG. 1, an existing combine construction is depicted schematically at 10 to represent a multitude of different combine constructions with which an extension assembly 12, according to the present invention, can be utilized. The combine 10 has a storage tank 14 bounding a storage space for accumulating harvested crop as the combine 10 is continuously operated. The combine 10 has a top opening 18 in communication with the tank storage space.

The combine 10 has a closure assembly 20, consisting of one or more panels. The closure assembly 20 has one or more surfaces 22 that are exposed to bound a volume within which harvested crop can be confined for storage above the storage tank 14.

The closure assembly 20 has closed and open states. In the closed state, it blocks the top opening 18. In the open state, progressively harvested crop can pass from within the storage tank 14 through the top opening 18 to be confined by the closure assembly panel(s)/surface(s) 22 in an exterior space above the storage tank 14. The crop storage capacity for the combine 10 is thus equal to the volume of the storage tank space plus the volume of the exterior space bounded by the closure assembly 20.

The extension assembly 12 is configured to further increase the storage volume capacity for the combine 10. The extension assembly 12 is configured to allow the closure assembly 20 to be changed between its closed and open states while at the same time increasing the storage capacity of the combine 10 with the closure assembly 20 in its open state. An extension assembly 12 might be included as original equipment. Alternatively, and as specifically described hereinbelow, the extension assembly 12 can be retrofit to a conventional type combine 10 with an existing closure assembly 20.

Figure 6:
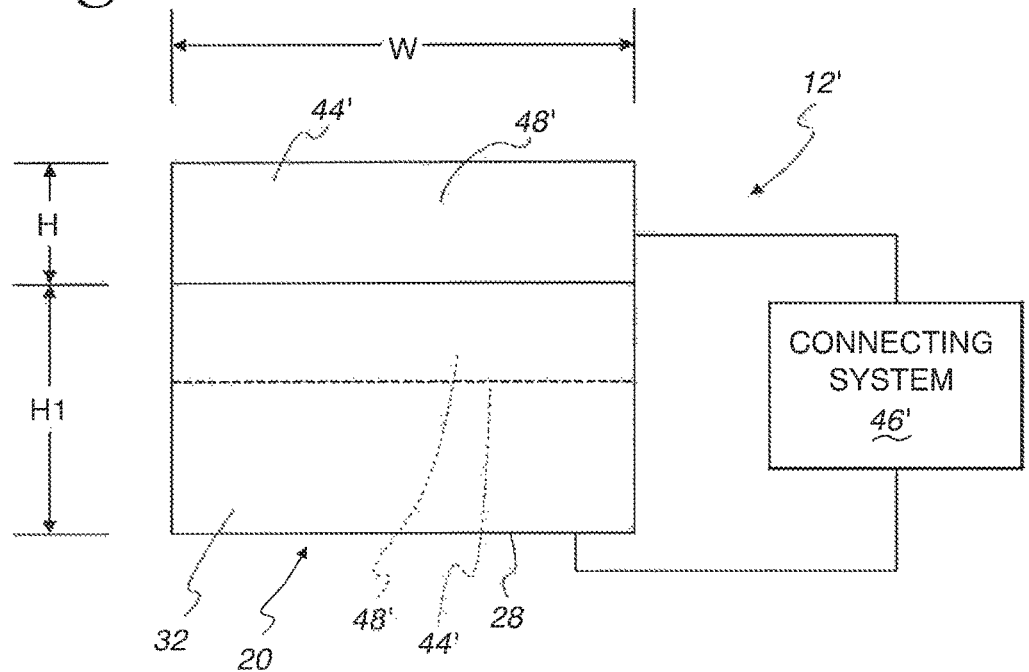
FIG. 6 is a partially schematic representation showing the conventional relationship between a panel on a closure system and an extension panel.
Figure 7:
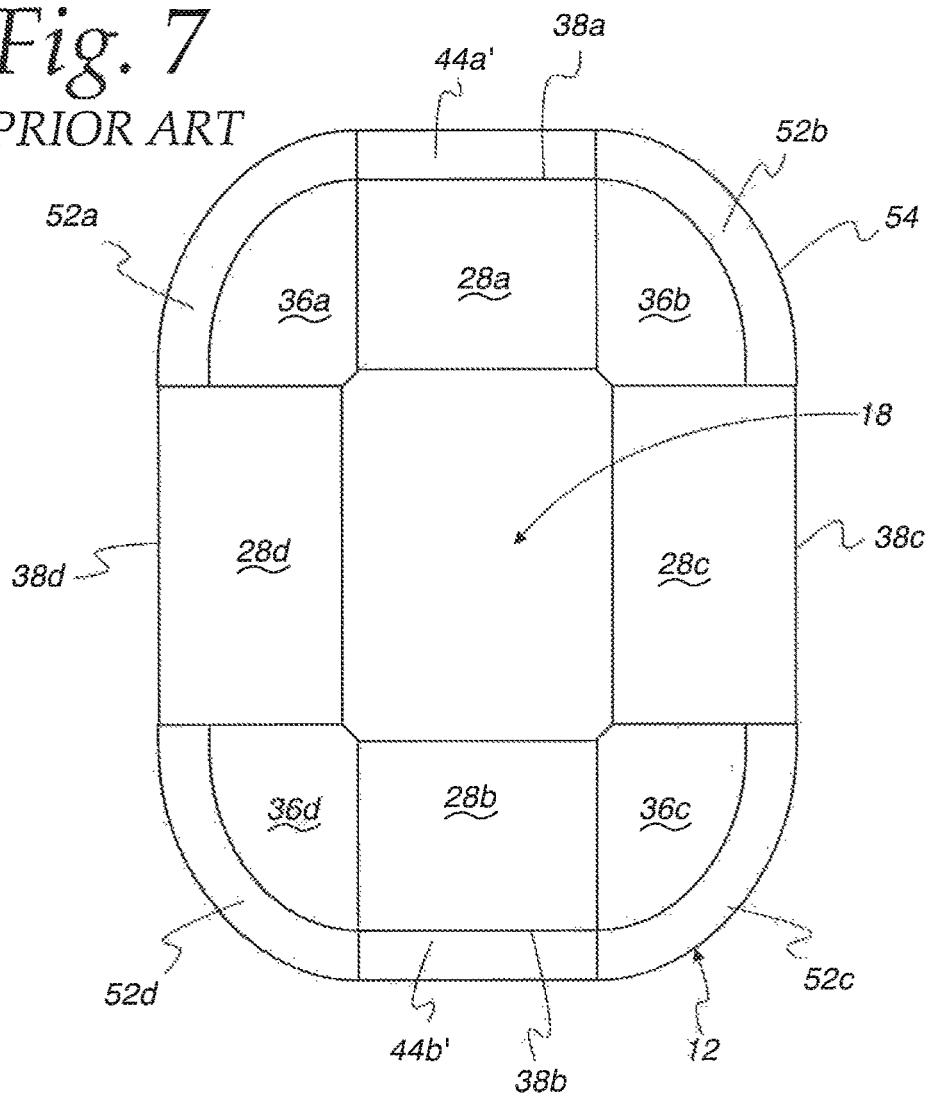
FIG. 7 is a view as in FIG. 3 wherein the closure system incorporates a conventional extension system, as shown in part in FIG. 6.

It should also be noted that extension assemblies operating in the same general manner as the inventive extension assembly currently exist, as explained with respect to FIGS. 6 and 7 herein. The structural and operational details of the extension assembly 12, as described hereinbelow, distinguish the inventive structure over the prior art.

The schematic showing of the combine 10 is intended to encompass virtually an unlimited number of different constructions therefor, including the closure assembly 20. Likewise, the schematic showing of the inventive extension assembly 12 is intended to encompass specific forms thereof as described hereinbelow, and virtually an unlimited number of different variations thereof, as would be obvious to one skilled in the art with the teachings herein in hand.

In FIGS. 2-5, an exemplary, known form of combine 10 is shown having a main frame 24 that supports one specific form of closure assembly 20. The closure assembly 20 is operatively joined to the main frame 24 through a connecting structure 26.

Figure 2:
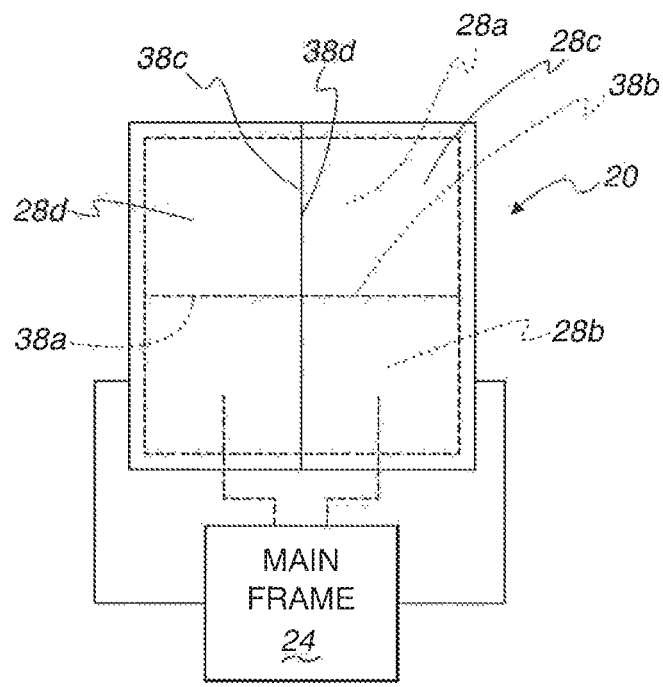
FIG. 2 is a partially schematic representation of one conventional form of hopper and closure assembly, of the type shown in FIG. 1, and with the closure assembly in a closed state.
Figure 3:
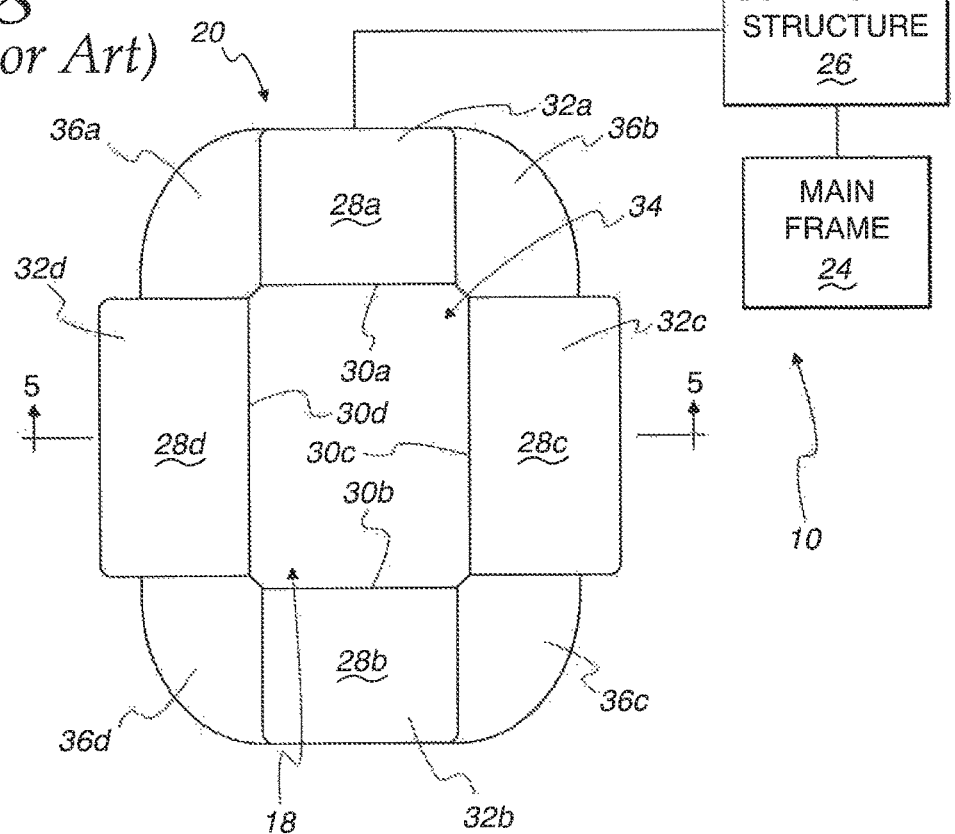
FIG. 3 is a view corresponding to that in FIG. 2, with the closure assembly in an open state.
Figure 4:
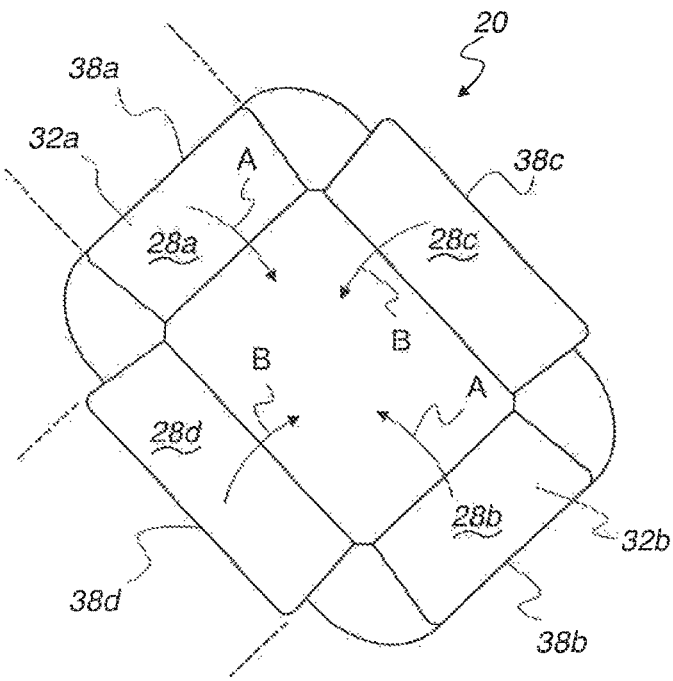
FIG. 4 is a view of the components in the FIG. 3 state from a different perspective.
Figure 5:
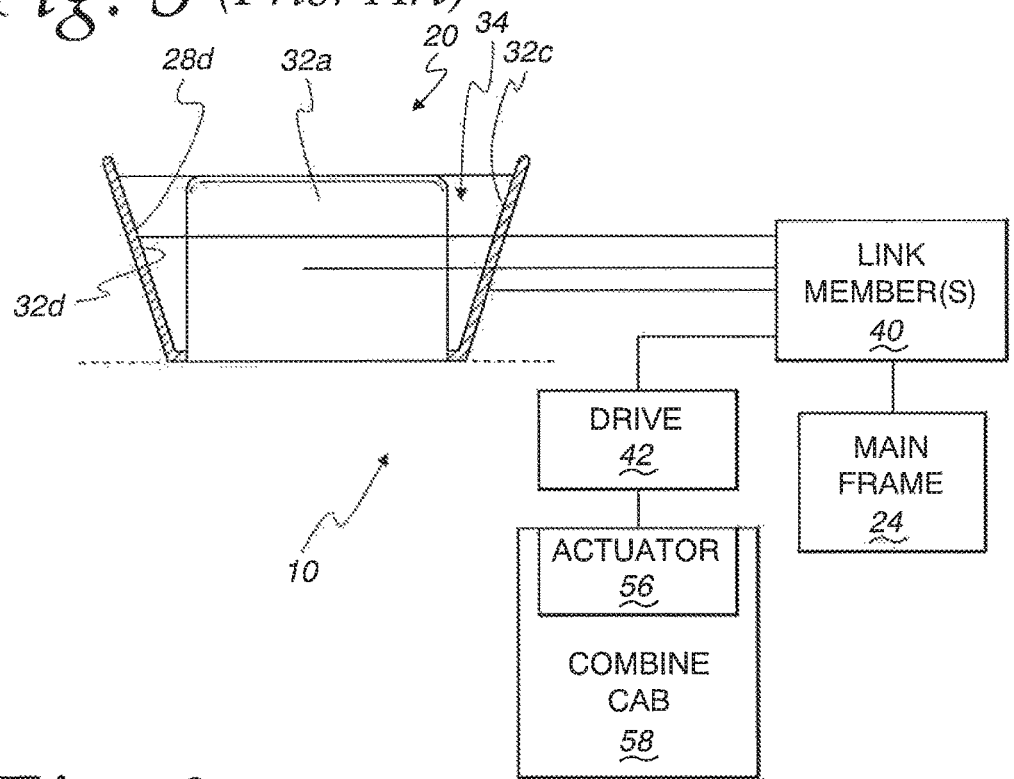
FIG. 5 is a cross-sectional view of the closure assembly taken along line 5-5 of FIG. 3 with certain cooperating components shown in schematic form.

The closure assembly 20 consists of four generally flat panels 28a, 28b, 28c, 28d. The panels are shown each with a generally rectangular shape and are movable in a coordinated manner to selectively change the closure assembly 20 between a closed state, as shown in FIG. 2, and an open state, as shown in FIGS. 3-5. The panels 28a-28d cooperate in pairs 28a, 28b and 28c, 28d. The panels 28a-28d pivot around horizontally extending axes at, or adjacent, their lower edges 30a, 30b, 30c, 30d. Repositioning of the panels 28a-28d is also possible using other than a fixed pivot axis arrangement.

With the closure assembly 20 in the open state, and the panels each in a first position, flat, exposed surfaces 32a, 32b, 32c, 32d, successively on the panels 28a, 28b, 28c, 28d, cooperatively bound a volume at 34 within which harvested crop can be confined for storage in the combine 10 above the main storage tank 14. With the closure assembly 20 in its open state, the surfaces 32a, 32b, 32c, 32d are angled to cooperatively produce a funnel shape that converges downwardly towards the opening 18.

Flexible barrier layers/pieces 36a, 36b, 36c, 36d extend successively between panels 28a, 28d; 28a, 28c; 28b, 28c; and 28b, 28d to form in conjunction with the panels 28a-28d a continuous crop confining wall around the volume 34. The flexible barrier layers/pieces 36a-36d prevent migration of harvested crop between adjacent panels and are reconfigurable to allow the closure assembly to be changed from the open state into the closed state without significant interference.

More specifically, the closure assembly 20 is changed from the open state into the closed state by initially pivoting/folding the panels 28a, 28b towards each other in the direction of the arrows A in FIG. 4 until they each realize a second position wherein their top edges 38a, 38b are in close proximity and the panel surfaces 32a, 32b are substantially coplanar. The panels 28c, 28d are pivoted/folded towards each other in the same manner, in the direction of the arrows B, into corresponding second positions, wherein they overlie the folded panels 28a, 28b. The top edges 38c, 38d may reside in close proximity, as shown in FIG. 2, or may abut or interengage. There is no particular limitation on how the movement of the panels 28a-28d is coordinated in changing the closure assembly 20 between the open and closed states.

The precise configuration of the panels 28a-28d and how they interact, particularly in the closed state for the closure assembly 20, is not critical. The vertical dimension of the panels 28a-28d is generally limited to allow them to intermesh in an overall flat arrangement with the closure assembly 20 in its closed state, wherein they collectively block the top opening 18. As noted above, the flexible barrier layer/pieces 36a-36d, which are conventionally made from one, or a combination of, canvas, fabric, rubber, etc, will readily fold or collapse so as not to interfere with this panel folding. The volume surrounded by the panels 28a-28d is dictated by the vertical dimension of the panels 28a-28d, which is inherently limited by their required interaction to cooperatively close the top opening 18.

In one conventional form, the connecting structure 26 includes one or more link members 40 connecting between the main frame 24 and one or more of the panels 28a-28d. The panels might be otherwise connected to follow movement of each other to reduce the number of link members 40. A suitable drive 42 repositions the link member(s) 40 to thereby effect changing of the state of the closure assembly 20 between open and closed.

As indicated above, it is known to incorporate extension assemblies, performing the basic function of the inventive extension assembly. The conventional extension assembly, as shown in FIGS. 6 and 7, is identified as 12'. As shown partially schematically in FIG. 6 for one exemplary panel 28, the extension assembly 12' has an extension panel 44' and a connecting system at 46' through which the extension panel 44' is operatively connected to the panel 28 on the closure assembly 20 that is part of the combine 10. The operatively connected extension panel 44' has a surface 48', with an area that is equal to H×W, that is exposed with the extension panel 44' in a deployed position as shown in solid lines in FIG. 6. The panel 28 has an exposed surface 32 with an area equal to H1×W with the closure assembly 20 in the open state.

With the closure assembly 20 in its open state, the surface 32 on the panel 28 bounds a volume within which harvested crop can be confined. With the closure assembly 20 in the open state and the extension panel 44' in its deployed position, the exposed surface area that bounds the storage volume is made up of a combination of the areas of the surface 32 on the panel 28 and the surface 48' on the extension panel 44'. By increasing the exposed volume bounding surface area, the storage capacity of the combine 10 is greater with the extension panel 44' in its deployed position compared to when the extension panel is absent or in a stored position, as now described.

In the stored position for the extension panel 44', as shown in dotted lines in FIG. 6, the extension panel 44' is repositioned relative to the panel 28 to reduce the combined vertical dimension of the panels 28, 44', whereby folding of the closure assembly 20 can take place as shown in FIG. 1.

The connecting system 46' that allows movement of the extension panel 44' relative to the rest of the combine 10, including the panel 28, may take a multitude of different forms.

This connecting system 46' may require or allow manual manipulation of the extension panel 44'. In one form, the connecting system 46' includes structure that causes the extension panel 44' to change from its stored position into its deployed position as an incident of the closure assembly 20 changing from its closed state into its open state. The structure of the connecting system 46' may likewise be such that the extension panel changes from its deployed position into its stored position as an incident of the closure assembly 20 changing from its open state into its closed state.

In one conventional form, as shown in FIG. 7, extension panels 44a', 44b' are provided on only the panels in the panel pair 28a, 28b. The panels 44a', 44b' have the same construction. The panels in the panel pair 28a, 28b have a lesser vertical extent than the panels in the panel pair 28c, 28d. The flexible barrier layer/pieces 36a, 36b, 36c, 36d generally extend to the top edges 38a, 38b of the panels 28a, 28b but do not extend fully to the top edges 38c, 38d of the panels 28c, 28d.

Accordingly, to avoid escape of harvested crop through the spaces between the extension panels 44a', 44b' and the adjacent panels 28c, 28d, at least one additional flexible barrier layer/piece 52a, 52b, 52c, 52d is incorporated at each such location. A continuous extension wall is thereby formed around the upper opening 18 up to a top perimeter edge 54 that is generally at the height of the top panel edges 38c, 38d fully around the opening 18. The flexible barrier layer/pieces 36 and 52 may be made from any suitable durable and collapsible material, such as rubber, canvas, etc.

Typically the drive 42 will be operated by an actuator 56 within a combine cab 58. The states of the closure assembly 20 and extension assembly 12 can be changed through the same, or different, actuators and/or drives.

The connecting system 46' shown schematically in FIG. 6 interconnects the closure assembly 20 and extension assembly 12' in a manner whereby changing the closure assembly 20 between its open and closed states causes one or more of the extension panels 44' to change between its deployed and stored positions.

Figure 8:
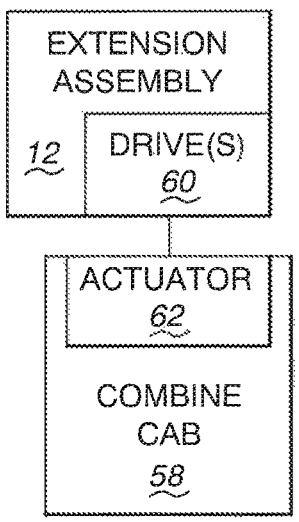
FIG. 8 is a schematic representation of a drive system for the inventive extension assembly.

With the inventive structure, as shown in FIG. 8, the extension assembly 12 may have one or more dedicated drives 60 directly operable through an actuator 62 in the combine cab 58. As just one example, the drive(s) 60 may utilize an extendible cylinder, or other type of structure well known to those skilled in this art. The extension assembly 12 may alternatively utilize the aforementioned drive 42.

Figure 9:
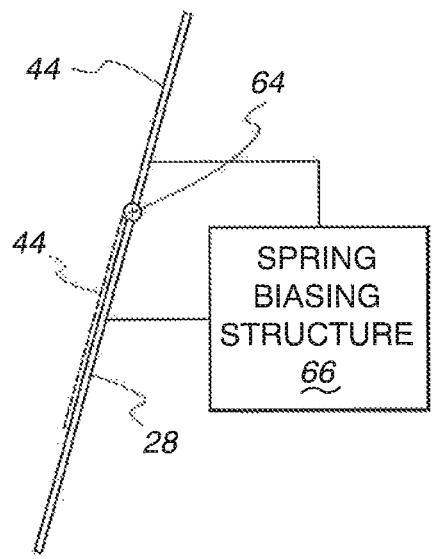
FIG. 9 is a partially schematic representation of part of the inventive extension assembly showing two different relationships between a panel and extension panel.

In one exemplary form of the invention, as shown partially schematically in FIG. 9, an extension panel 44 is connected to the panel 28 for pivoting movement around an axis 64 in changing between the deployed position, as shown in solid lines, and the stored position, as shown in dotted lines. A spring biasing structure at 66 produces a biasing force that urges the extension panel 44 into the stored position.

The extension panel 44 is preferably made with a rigid construction. Metal sheeting can be used for this purpose. However, other materials and construction are contemplated.

Figure 10:
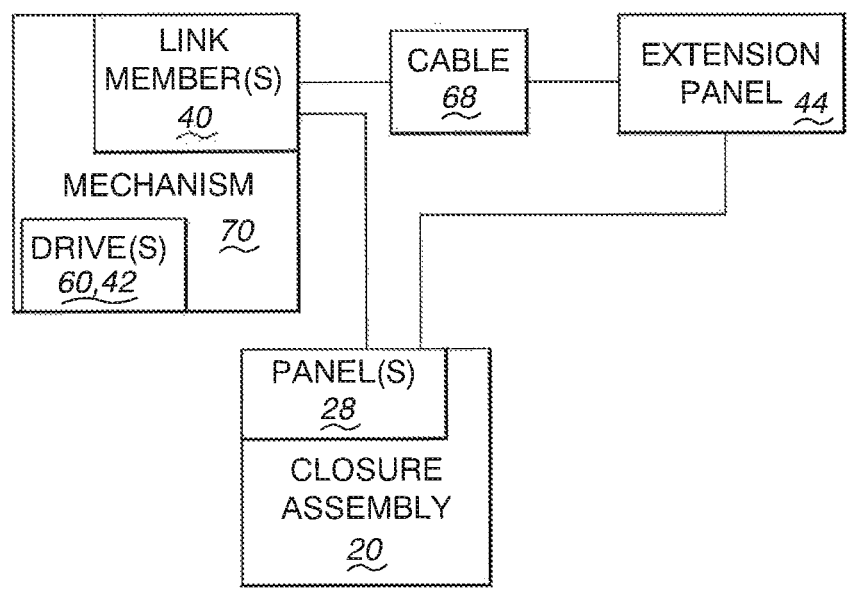
FIG. 10 is a schematic representation of one exemplary form of connecting system, according to the invention, utilizing a cable to reconfigure the extension assembly.

In one exemplary form, as shown in FIG. 10, a cable 68 is utilized to reposition the extension panel 44 against the bias force into the deployed position therefor. Preferably, the cable 68 is associated with one of the link members 40 that is part of a mechanism 70 utilized to reposition the panels to thereby change the state of the closure assembly 20. The mechanism 70 is operated through the drive(s) 60 which may be the same as the drive 42 or a separate drive, Essentially, the cable 68 is connected between the extension panel 44 and the link member(s) 40 which moves as the closure assembly 20 is changed between the closed and open states. As the closure assembly 20 is changed from the closed state into the open state, the movement of the link member(s) 40 is such that the cable 68 is tensioned to exert a force on the extension panel 44 that changes the extension panel from its stored position into its deployed position. As the closure assembly 20 is changed back into the closed state, the link members) 40 moves so that the tension on the cable 68 is released to slacken the cable, whereupon the spring biasing structure 66 can drive the extension panel 44 from the deployed position back into the stored position.

Since it is contemplated that the extension assembly 12 can be retrofit to numerous different combine hopper configurations, with the understanding of the basic principles herein in hand, one skilled in the art can utilize the movement of the various closure assembly parts to control positioning of the extension panel(s) 44 on the extension assembly 12.

One exemplary construction for the extension assembly 12 on an exemplary known hopper construction is shown in FIGS. 11-17. The structure is described with one representative panel 28a and associated extension panel 44a.

Figure 11:
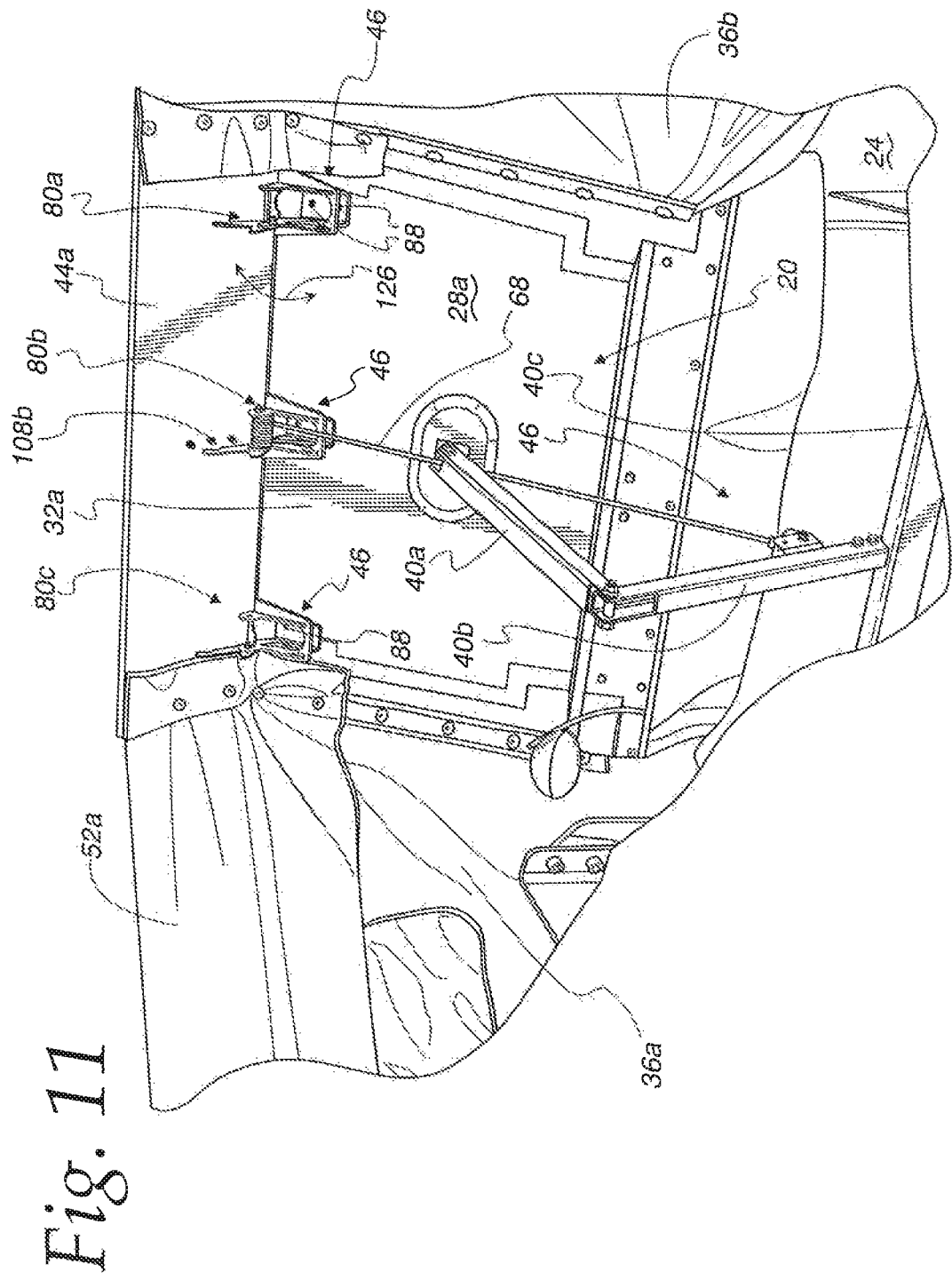
FIG. 11 is a fragmentary, perspective view of one exemplary form of the structure in FIG. 10 with the closure assembly in an open state and with an extension panel on the inventive extension assembly in a deployed state.
Figure 12:
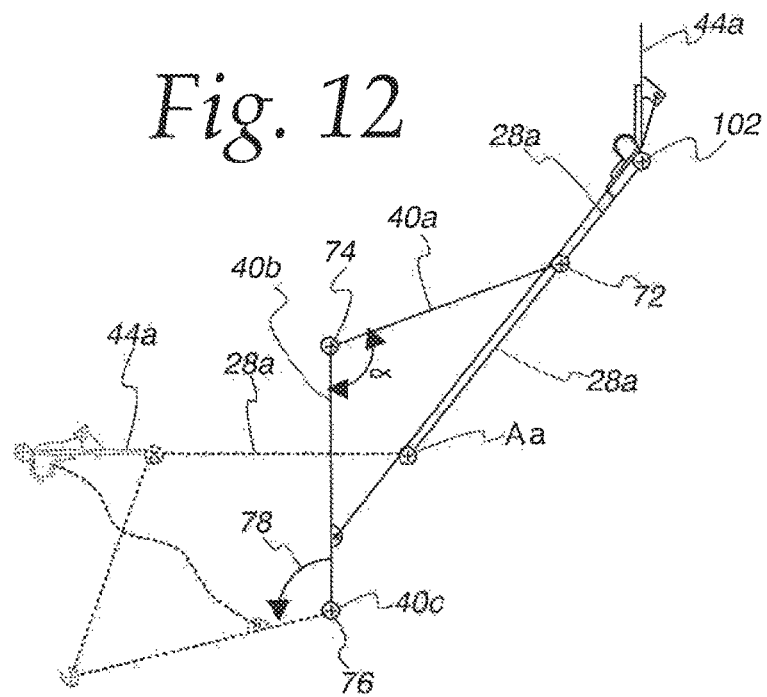
FIG. 12 is a schematic representation of the extension panel and closure assembly panel in FIG. 11 and with the closure assembly in an open state in solid lines and a closed state in dotted lines.
Figure 13:
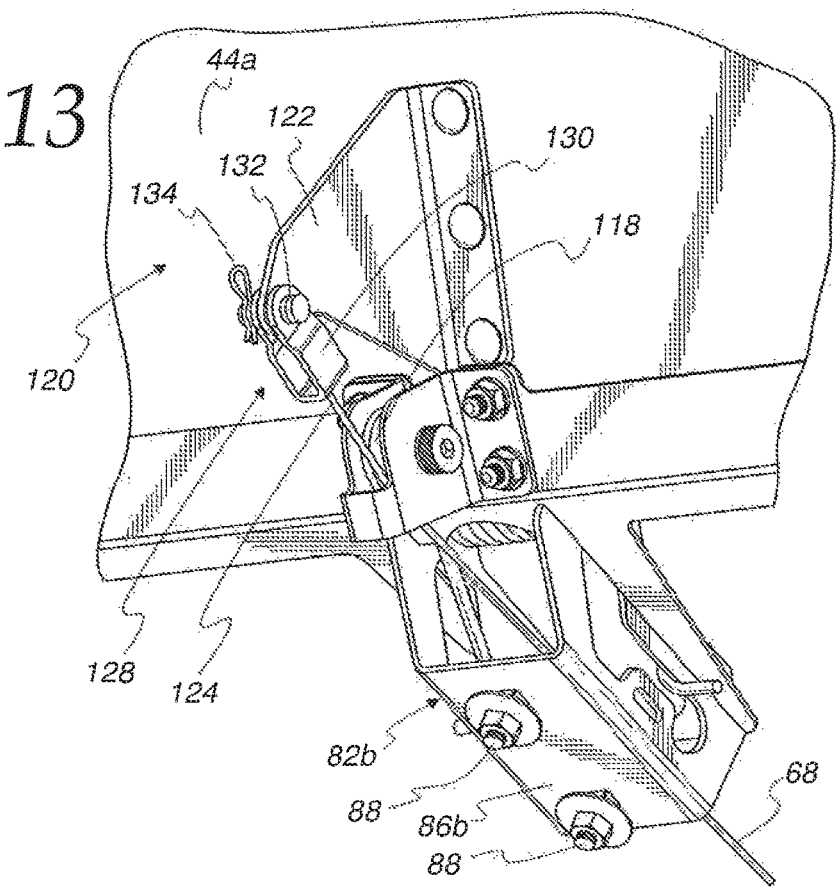
FIG. 13 is an enlarged, fragmentary, perspective view of part of a connecting system between the extension panel and combine and utilizing a cable.

The panel 28a, as shown in solid lines in FIG. 12 and in FIG. 11, is in a position corresponding to the open state for the closure assembly 20. The panel 28a is pivoted from that position into the dotted line position in FIG. 12, corresponding to the closed state for the closure assembly 20, around the horizontally extending axis Aa. The pivoting force is imparted through the link member 40a, that has one end connected to the panel 28 for pivoting movement around a horizontally extending axis 72. The opposite end of the link member 40a is connected to a second link member 40b for pivoting movement around an axis 74 that is generally parallel to the axis 72. The opposite end of the link member 40b is fixedly connected to a bar/link member 40c that pivots relative to the main frame 24 around an axis 76, that is substantially parallel to the axes 72, 74. As the panel 28a moves in response to the closure assembly 20 changing from its open state into its closed state, the link member 40c pivots in the direction of the arrow 78 around the axis 76. The link members 40a, 40b reposition in response to this movement, as a result of which an angle α therebetween is reduced until the dotted line position in FIG. 12 is realized as the plane of the panel 28a orients horizontally.

In this particular embodiment, the connecting system 46, through which the extension panel 44a is operatively connected to the combine, includes three hinges 80a, 80b, 80c, Each of the hinges 80a, 80b, 80c has the same general construction. Cup-shaped hinge parts 82a, 82b, 82c are joined by an elongate strip 84 to define a unitary structure. The bottom wall 86a, 86b, 86c of the "cup" shape is fixed to the panel 28a against the exposed surface 32a. As depicted, this connection is effected through fasteners, as in the form of bolts 88.

The hinge part 82b defines spaced flanges 90b, 90b' between which a coiled portion 92b of a torsion coil spring 94b is mounted. The coiled portion 92b surrounds a shaft 96b.

A flange 98b projects away from the exposed surface of the extension panel 44a and resides adjacent the flange 90b' on the hinge part 82b. A bolt 100b extends through the flanges 90b, 90b', the shaft 96b within the coiled portion 92b of the spring 94b, and the flange 98b to thereby support the extension panel 44b for pivoting movement around an axis 102 relative to the associated panel 28. At the same time, the torsion coil spring 94b is operatively positioned and preloaded. One end 104b of the torsion spring 94b is placed into a slot 106b on the hinge part 82b. The opposite spring end 108b is placed in a slot 110b on the flange 98b on the extension panel 44a. With this arrangement, the extension panel 44a is spring biased by the spring 94b in the direction of the arrow 112 around the axis 102.

Each hinge part 82a, 82b, 82c is configured to accommodate a torsion spring such as the torsion coil spring 94b. One to three, or more than three, springs 94 may be used. Together, the single or multiple torsion springs 94 make up part of the aforementioned spring biasing structure 66.

Figure 15:
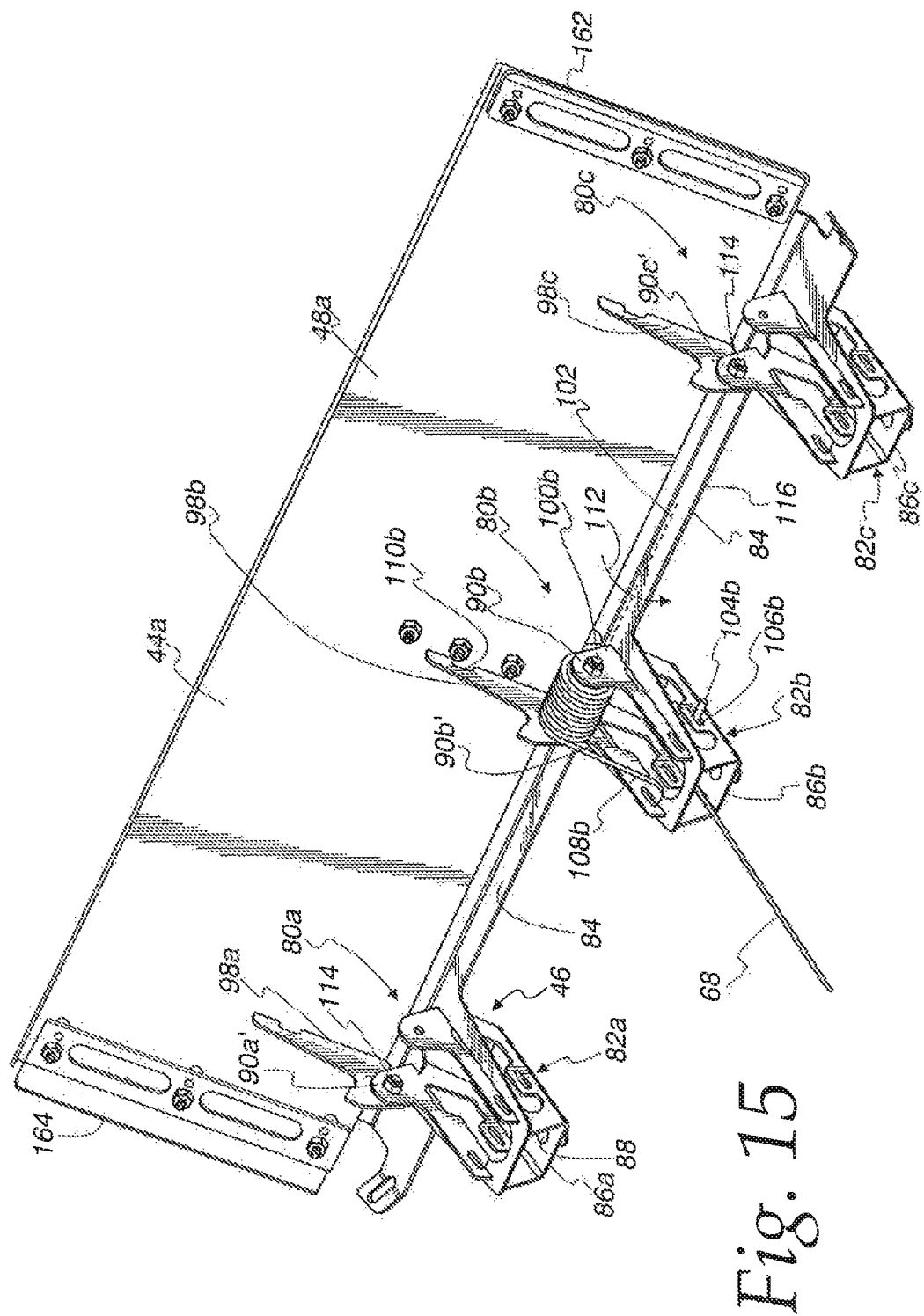
FIG. 15 is an enlarged perspective view of one of the extension panels with part of the inventive connecting system.

As depicted in FIG. 15, with a single spring construction, one of the flanges 90a', 90c' can be joined to a flange 98a, 98c on the extension panel 44a through a fastener/bolt 114 to thereby guide pivoting movement of the extension panel 44a relative to the panel 28a around the axis 102.

The bottom surface 116 of the strip 84 may be made to at least nominally conform to the top edge 38a of the panel 28a, as shown in FIG. 4, with the panel 44a in its deployed position.

The control cable 68 has one end connected to the link member 40b. The cable 68 extends from the link member 40b through the hinge part 82b, around a guide pulley 118, at the side 120 of the extension panel 44a opposite to the surface 48a, and up to a bracket 122 at which the cable end 124 is fixed. The brackets 122 and pulley 118 are sized and located to guide the cable 68 so that it can be tensioned to move the extension panel 44a against the bias force of the torsion spring(s) 94, into the deployed position shown in FIG. 11, without binding or significant interference. The extension panel 44a pivots through an angle, indicated by the double-headed arrow 126, that is typically greater than 90°, away from its stored position, to realize the fully deployed position. The angle indicated by the double-headed arrow 126 is more preferably on the order of 135° or more. This angle is dictated by the overall configuration of the closure assembly 20.

The length of the cable 68 is selected so that with the closure assembly 20 in the FIG. 11/open state, the tensioned cable 68 draws the extension panel 44a into its optimal deployed orientation. As the closure assembly 20 is moved from the open state in FIG. 11 towards its closed state, the link members 40a, 40b move relative to each other, as shown in FIG. 12, which reduces the distance between the mount locations for the cable ends at the bracket 122 and the link member 40b. As a result, the cable 68 slackens, which allows the biasing force in the torsion spring(s) 94 to drive the extension panel 44a back into its stored position. As noted above, in this stored position, the extension panel 44a will not interfere with the folding of the panels 28a, 28b, 28c, 28d, as shown in FIG. 2.

To facilitate both mounting and adjustment of the cable 68, a releasable connector 128 is provided at the cable end 124. The cable end 124 can be suitably joined to a U-shaped connector part 130, as through a crimp fitting, or the like. The connector part 130 straddles the bracket 122 and is held in place by a post 132 with a locking pin 134 thereon.

The opposite cable end 136 is joined to the link member through a hinge bracket 138, having one U-shaped part 140 secured to the link member 40b through fasteners/bolts 142. A separate bracket part 144 is connected to the first bracket part 140 through a secured bolt 146 which allows the parts 140, 144 to pivot relative to each other around an axis 148. The bracket part 144 is U-shaped with the bolt 146 extending through separate legs 150, 152 thereon. The base 154 of the "U" supports the cable end 136, which has a threaded fitting 156 thereon that can be moved lengthwise relative to the base 154 through fixed, threaded, receiving parts 160 to select a desired cable length.

Figure 14:
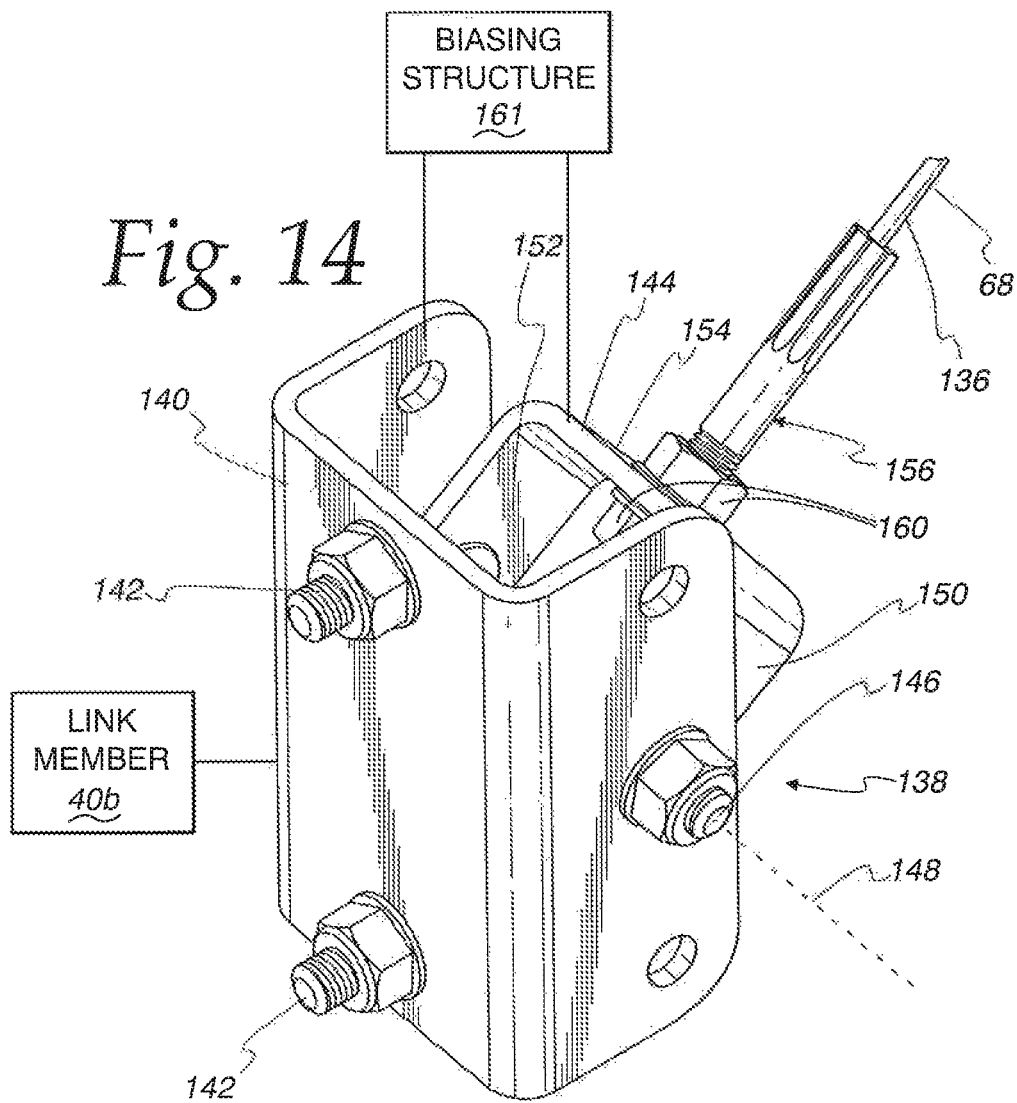
FIG. 14 is an enlarged, fragmentary, perspective view showing the connection of the cable end opposite the end shown in FIG. 13.

As seen in FIG. 14, a biasing structure 161 normally urges the bracket part 144 relative to the bracket part 140 towards the depicted relationship. The projection angle of the cable 68 can thereby be controlled to avoid cable positioning that might cause the cable 68 to bind with other system parts. The schematic showing in FIG. 14 is intended to encompass different biasing component configurations including, but not limited to, torsion coil springs, compression springs, etc.

The biasing structure could, alternatively, urge the panels into their deployed position. The remainder of the apparatus could be easily modified to accommodate this variation.

Spaced plates 162, 164 are bolted to laterally opposite locations on the extension panel 44*a*. The plates 162, 164 can be initially loosened and thereafter tightened to capture edges of the flexible barrier pieces 52*a*, 52*b* against the extension panel 44*a* to maintain the same in place.

The extension assembly 12 may be a dedicated unit that is added to the hopper frame. Alternatively, the extension assembly 12 can be retrofit to an existing manual, or automated, system for selectively closing the hopper opening 18. The cable operation is only exemplary in nature.

With the above-described structure, a method of retrofitting a combine with the inventive extension assembly may be carried out as shown in block diagram form in FIG. 18. As shown at block 168, an extension assembly, as described above, is obtained.

As shown at block 170, the extension assembly is integrated into the combine so that with the closure assembly on the combine in an open state, the extension assembly, in conjunction with the closure assembly, bound a volume within which harvested crop can be confined for storage that is greater than a storage volume in the absence of the extension assembly.

The foregoing disclosure of specific embodiments is intended to be illustrative of the broad concepts comprehended by the invention.

The invention claimed is:

1. An extension assembly for a storage tank on a combine, the storage tank bounding a storage space for processed crop, the storage space having a volume, the combine having a top opening in communication with the storage space, the combine further comprising a closure assembly for the top opening with closed and open states, the closure assembly comprising at least one panel having one surface with one area that with the one panel in a first position is exposed to bound a part of an exterior space above the storage space to thereby effectively increase the volume of the storage space with the closure assembly in the open state, the one panel changed from the first position into a second position as an incident of the closure assembly being changed from the open state into the closed state, the extension assembly comprising:
   a first extension panel having a first surface with a first area; and
   a connecting system through which the first extension panel is operatively connected to the combine,
   the operatively connected first extension panel and connecting system configured so that the first extension panel is changeable between a deployed position and a stored position,
   with the extension assembly on the combine, the first extension panel in the deployed position situated so that the first surface and one surface define a combined exposed surface area that is greater than the first area of the first surface,
   the combined surface area exposed to confine processed crop in the exterior space with the closure assembly in the open state,
   wherein the first extension panel is urged by a spring biasing force into one of the deployed and stored positions,
   the connecting system comprising a cable that is arranged to exert a force on the first extension panel to change positions of the first extension panel between the deployed and stored positions.

2. The extension assembly for a storage tank on a combine according to claim 1 in combination with the combine and wherein the first extension panel is connected to the one panel for pivoting movement relative to the one panel around an axis.

3. The extension assembly for a storage tank on a combine according to claim 1 wherein with the first extension panel in the stored position the one surface and first surface face each other.

4. The combination according to claim 2 wherein the first extension panel is spring biased relative to the one panel into the stored position.

5. The extension assembly for a storage tank on a combine according to claim 1 in combination with the combine and wherein the extension assembly and combine are configured so that the first extension panel is changed from the stored position into the deployed position as an incident of the closure assembly changing from the closed state into the open state.

6. The extension assembly for a storage tank on a combine according to claim 1 in combination with the combine and further comprising an actuator that is operable to change the extension panel from the stored position into the deployed position.

7. The combination of claim 6 wherein the combine, extension panel, connecting system, and actuator are configured so that operation of the actuator causes the closure assembly to change from the closed state into the open state as an incident of which the first extension panel is changed from the stored position into the deployed position.

8. The combination according to claim 7 wherein the cable is tensioned as the closure assembly is changed from the closed state into the open state to thereby overcome the biasing force and move the first extension panel from the stored position into the deployed position.

9. The combination according to claim 8 wherein the biasing force is generated by a spring member acting between the one panel and the first extension panel.

10. The combination according to claim 9 wherein the spring member is a torsion coil spring.

11. The extension assembly for a storage tank on a combine according to claim 1 wherein the first extension panel is mounted to the one panel for pivoting movement around an axis and the first extension panel pivots through more than 90° relative to the one panel in changing between the deployed and stored positions.

12. The extension assembly for a storage tank on a combine according to claim 1 wherein the closure assembly comprises a second panel and the extension assembly comprises a flexible barrier layer that extends between the operatively connected first extension panel and the second panel to block migration of harvested crop to between the first extension panel and second panel.

13. The extension assembly for a storage tank according to claim 1 in combination with the combine, wherein the closure assembly comprises a plurality of panels including the one panel that are movable relative to each other as the closure assembly is changed between the closed and open states, the plurality of panels cooperatively: a) blocking the top opening with the closure assembly in the closed state; and b) extending around a volume of the exterior space within which harvested crop can be confined for storage with the closure assembly in the open state.

14. The extension assembly for a storage tank on a combine according to claim 1 in combination with the combine and wherein the extension assembly and combine are configured so that the first extension panel is changed from the deployed position into the stored position as an incident of the closure assembly changing from the open state into the closed state.

15. The extension assembly for a storage tank on a combine according to claim 1 in combination with the combine wherein the closure assembly comprises first and second panel pairs, wherein one of the panel pairs includes the one panel and another panel and there is a second extension panel, substantially the same as the first extension panel on the another panel.

16. The combination according to claim 15 wherein the panels in the one panel pair each is pivotably mounted to the combine so that the panels in the one panel pair pivot simultaneously towards and away from each other as the closure assembly is changed between the closed and open states respectively.

17. The combination according to claim 15 wherein the panels in the other of the panel pairs each is pivotably mounted to the hopper so that the panels in the other of the panel pairs pivot simultaneously towards and away from each other as the closure assembly is changed between the closed and open states, and in the closed state for the closure assembly a plurality of the panels are in overlying relationship.

18. The combination according to claim 8 wherein the combine has a main frame and at least one link member that moves guidingly relative to the main frame as the closure assembly is changed between the open and closed states and one part of the cable is connected to follow movement of the one link member.

19. The combination according to claim 15 wherein the extension assembly comprises first and second flexible barrier layer components, the first barrier layer component extending between the first extension panel and one of the panels in the other panel pair to block migration of harvested crop to between the first extension panel and the one of the panels in the other panel pair, the second barrier layer component extending between the first extension panel and the other of the panels in the other panel pair to block migration of harvested crop to between the first extension panel and the other of the panels in the other panel pair.

20. The combination according to claim 1 wherein the first extension panel is spring biased into the storage position and the combine and extension assembly are configured so that the extension panel is moved by a cable from the storage position into the deployed position as an incident of the closure assembly changing from the closed state into the open state.

21. A method of retrofitting a combine that has a storage tank bounding a storage space for a processed crop, a top opening in communication with the storage space, and a closure assembly for the top opening comprising a plurality of panels movable to thereby change the closure assembly between closed and open states, the combine configured so that with the closure assembly in the open state harvested crop can move from the storage space upwardly through the top opening and the panels bound a first volume outside of the storage space within which harvested crop can be confined for storage to supplement storage capacity for the storage tank, with the closure assembly in the closed state the panels cooperatively blocking the opening, the method comprising the steps of:
obtaining an extension assembly as recited in claim 1; and
integrating the extension assembly into the combine so that with the closure assembly in the open state, the extension assembly, in conjunction with the closure assembly, bounds a second volume outside of the storage space within which harvested crop can be confined for storage that is greater than the first volume.

22. In combination:
a) a combine having a storage tank, the storage tank bounding a storage space for processed crop, the storage space having a volume, the combine having a top opening in communication with the storage space, the combine further comprising a closure assembly for the top opening with closed and open states, the closure assembly comprising at least one panel having one surface with one area that with the one panel in a first position is exposed to bound a part of an exterior space above the storage space to thereby effectively increase the volume of the storage space with the closure assembly in the open state, the one panel changed from the first position into a second position as an incident of the closure assembly being changed from the open state into the closed state; and
b) an extension assembly comprising:
a first extension panel having a first surface with a first area; and
a connecting system through which the first extension panel is operatively connected to the combine,
the operatively connected first extension panel and connecting system configured so that the first extension panel is changeable between a deployed position and a stored position,
the first extension panel in the deployed position situated so that the first surface and one surface define a combined exposed surface area that is greater than the first area of the first surface,
the combined surface area exposed to confine processed crop in the exterior space with the closure assembly in the open state,
wherein the connecting system comprising a cable connected to the first extension panel,
the combine and extension assembly configured so that the cable is controlled to change the position of the first extension panel between the stored position and deployed position as an incident of the closure assembly changing between the closed and open state.

23. An extension assembly for a storage tank in combination with a combine, the storage tank bounding a storage space for processed crop, the storage space having a volume, the combine having a top opening in communication with the storage space, the combine further comprising a closure assembly for the top opening with closed and open states, the closure assembly comprising at least one panel having one surface with one area that with the one panel in a first position is exposed to bound a part of an exterior space above the storage space to thereby effectively increase the volume of the storage space with the closure assembly in the open state, the one panel changed from the first position into a second position as an incident of the closure assembly being changed from the open state into the closed state, the extension assembly comprising:
a first extension panel having a first surface with a first area; and
a connecting system through which the first extension panel is operatively connected to the combine, the operatively connected first extension panel and connecting system configured so that the first extension panel is changeable between a deployed position and a stored position, with the extension assembly on the combine, the first extension panel in the deployed position situated so that the first surface and one surface define a combined exposed surface area that is greater than the first area of the first surface, the combined surface area exposed to confine processed crop in the exterior space with the closure assembly in the open state, wherein the first extension panel is urged by a biasing force into one of the deployed and stored positions, the combination further comprising an actuator that is operable to change the extension panel from the stored position into the deployed position, wherein the combine, extension panel, connecting system, and actuator are configured so that operation of the actuator causes the closure assembly to change from the closed state into the open state as an incident of which the first extension panel is changed from the stored position into the deployed position, wherein the connecting system comprises a cable connected to the first extension panel, the cable tensioned as the closure assembly is changed from the closed state into the open state to thereby overcome the biasing force and move the first extension panel from the stored position into the deployed position.

* * * * *